(12) United States Patent
Dykhuizen et al.

(10) Patent No.: US 6,747,980 B1
(45) Date of Patent: Jun. 8, 2004

(54) METHODS, APPARATUSES AND SYSTEMS FOR MANAGING MULTIPLE SIGNALING END POINTS IN A SIGNALING SYSTEM 7 NETWORK

(75) Inventors: David Brad Dykhuizen, Plano, TX (US); Jacqueline Ann Dykhuizen, Plano, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/468,677

(22) Filed: Dec. 21, 1999

(51) Int. Cl.[7] .................... H04L 12/56; H04L 12/28; H04J 3/16
(52) U.S. Cl. .................. 370/401; 370/410; 370/467; 379/230
(58) Field of Search ................. 370/230, 235, 370/352–356, 385, 401, 410, 467; 379/221.08–221.12, 230, 111, 112.01, 733; 714/21, 137

(56) References Cited

U.S. PATENT DOCUMENTS

| | | | |
|---|---|---|---|
| 5,898,667 A | * 4/1999 | Longfield et al. | 370/225 |
| 6,084,956 A | * 7/2000 | Turner et al. | 379/230 |
| 6,215,765 B1 | 4/2001 | McAllister et al. | |
| 6,226,289 B1 | * 5/2001 | Williams et al. | 370/385 |
| 6,278,707 B1 | 8/2001 | MacMillan et al. | |
| 6,356,627 B1 | * 3/2002 | Hayball et al. | 379/112.01 |
| 6,496,577 B1 | * 12/2002 | Kajitani | 379/207.11 |

* cited by examiner

Primary Examiner—Duc Ho

(57) ABSTRACT

The present invention provides a method of managing multiple signaling end points in a telecommunications network. The method includes the steps of defining one or more extended capability codes within one or more Signaling System 7 Gateways, where each extended capability code corresponds to one or more signaling end points within a data network, tracking the accessibility of the signaling end points associated with each extended capability code, and listing states of the accessibility of the extended capability codes.

16 Claims, 4 Drawing Sheets

METHODS, APPARATUSES AND SYSTEMS FOR MANAGING MULTIPLE SIGNALING END POINTS IN A SIGNALING SYSTEM 7 NETWORK

TECHNICAL FIELD OF THE INVENTION

The present invention relates generally to the field of telecommunications and more particularly to methods, systems and apparatuses for managing multiple signaling end points in a communications network.

BACKGROUND OF THE INVENTION

The Telecommunications Industry has steadily grown from the times of wired networks. Traditionally, most telecommunications networks were Signaling System 7 Networks. Data traveling on the networks would be in Signaling System 7 protocol from the originating end node in the network to the destination end node in the network. Today, however, new data networks are emerging in the telecommunications industry. Networks based upon the Internet Protocol are becoming more widespread. The main reason for the rapid growth is the relative inexpense associated with such networks.

A problem exists, however, with the ever changing telecommunications industry. Disregarding or building around the Signaling System 7 architecture can be costly. Moreover, is the Signaling System 7 networks tend to be reliable, a known commodity. Thus, telecommunications companies seek ways to merge the pre-existing Signaling System 7 network with the modern networks, such as the Internet Protocol network.

Such transitioning already occurs in network configurations today. Many Signaling System 7 messages travel through a Signaling System 7 networks destined for a signaling end point located within an Internet Protocol network. The problem, however, is that the transition from the Signaling System 7 network to the Internet Protocol network occurs only near the end of travel path for the message. This means that the message is traveling mostly across the much more expensive Signaling System 7 network, and spending little time traveling as a cheaper Internet Protocol message. Thus, new means for transitioning messages from Signaling System 7 messages to Internet Protocol messages is needed.

SUMMARY OF THE INVENTION

The present invention provides a method of managing multiple signaling end points in a telecommunications network. The method includes the steps of defining one or more extended capability codes within one or more Signaling System 7 Gateways. Each extended capability code corresponds to one or more signaling end points within a data network. The method further includes the steps of tracking the accessability of the signaling end points associated with each extended capability code, and listing the states of accessability of the extended capability codes.

The present invention also provides a system for managing multiple signaling end points in a telecommunications network. The system includes one or more signaling end points being identified by one or more extended capability codes. The system further includes one or more Signaling System 7 Gateways in communication with the signaling end points, the Signaling System 7 Gateways being configured to list the states of accessability of the extended capability codes by tracking the accessability of the signaling end points.

DETAILED DESCRIPTION

Figure 1:
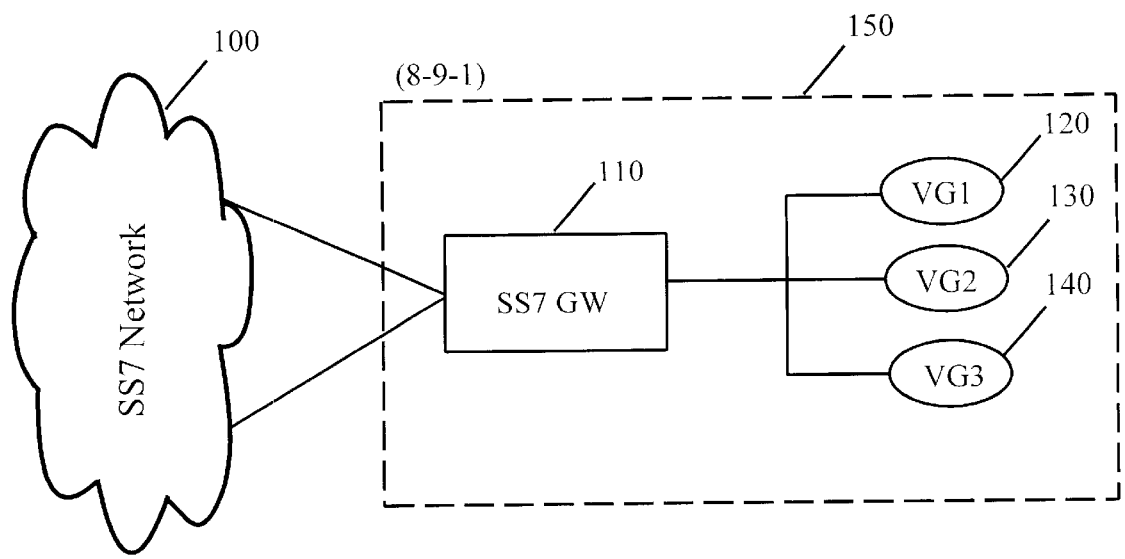
FIG. 1 is a schematic diagram of an Signaling System 7 network as it presently exists today.
Figure 2:
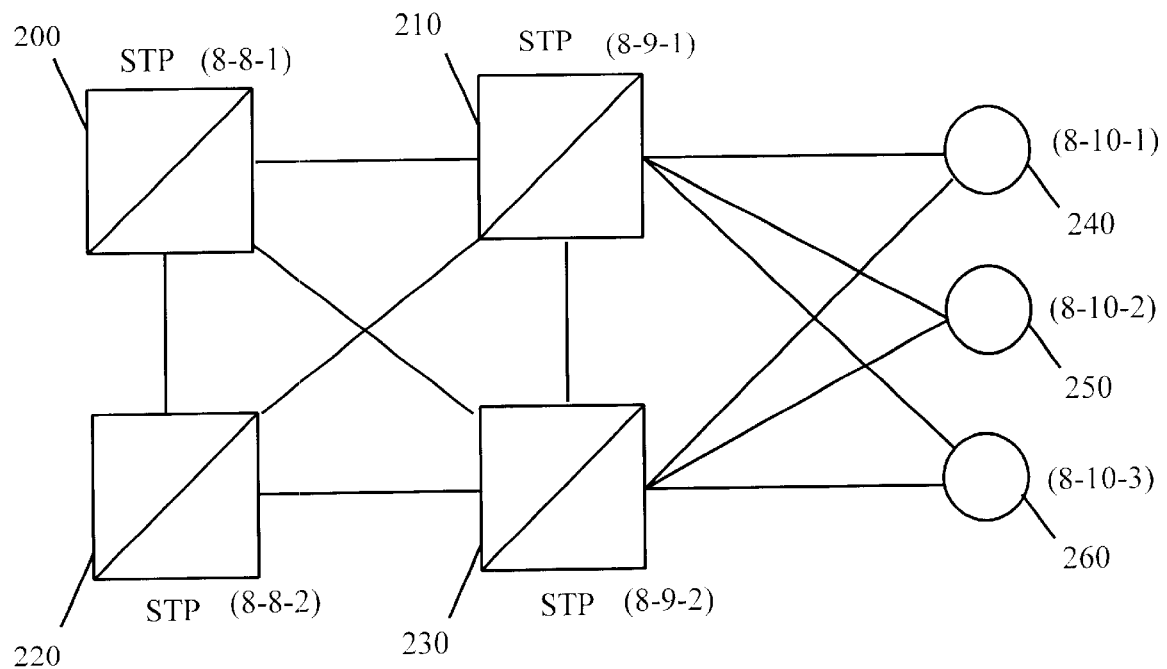
FIG. 2 is a schematic diagram showing a mated pair configuration of signaling transfer points as presently used in Signaling System 7 network today.

Referring to FIGS. 1 and 2, a basic Signaling System 7 (SS7) network architecture, in accordance with the prior art, is depicted. As shown, an SS7 network 100 is in communication with an SS7 gateway 110. The SS7 gateway 110 is in communication with multiple signaling end points 120, 130, and 140. The signaling end points 120, 130, and 140 are represented as voice gateways but could be any type of signaling end point. Under normal operation, an SS7 message is sent from the SS7 network 100 to the SS7 gateway 110. The SS7 message is destined for a signaling end point, such as the voice gateway 120. Once the SS7 gateway 110 receives the SS7 message, it transitions the SS7 message to an Internet Protocol message conforming with the Internet Protocol standard and transfers the message to the destined signaling end point 120. The signaling end points 120, 130, and 140 all reside in a data network. The data network can be an Internet Protocol Network, a Transmission Control Protocol Network, a User Datagram Protocol, and the like. Thus, the SS7 gateway must transition all messages from an SS7 format to a data network format.

The architecture presented in FIG. 1 poses a significant disadvantage because the SS7 gateway and the various signaling end points are seen by the SS7 network as one point code, as shown by block 150. A point code is a physical representation or address for particular elements within a communications network. In FIG. 1, the SS7 gateway 110 and the end points 120, 130, and 140 are seen by the SS7 network as a single point code (8-9-1). All traffic from the SS7 network destined for 8-9-1 will be received by the SS7 gateway 110 and transferred to the signaling end points 120, 130, and 140. If, however, a message is sent from the SS7 network 100 to the SS7 gateway 110 and the message is destined for the point code (8-9-2), for example, then that message will be discarded and a message will be sent back from the SS7 gateway 110 to the SS7 network 100 informing the SS7 network 100 that the SS7 gateway 110 cannot receive messages for (8-9-2). Similarly, if the SS7 gateway 110 is inaccessible, all elements associated with point code (8-9-1) will be inaccessible. In addition, if one of the signaling end points 120, 130, or 140 is inaccessible, then the point code (8-9-1) operates at a reduced capacity. The SS7 gateway cannot manage the states of the signaling end points 120, 130 and 140.

Referring now to FIG. 2, a further illustration of the general architecture of a SS7 network of the prior art is shown. FIG. 2 depicts several signaling transfer points labeled 200, 210, 220, and 230, respectively. The signaling transfer points are in a mated pair configuration. This means, that the signaling transfer point 200 and the signaling transfer point 210 are mated with the signaling transfer points 220 and 230, respectively. Signaling end points 240, 250, and 260 are also depicted in FIG. 2. As shown, the signaling transfer points 210 and 230 are capable of transferring messages to all of the signaling end points.

The signaling transfer points and the signaling end points all have a unique point code associated with them. When an SS7 message comes from the SS7 network, the message will have a point code as its destination. The point code is associated with a specific element within the network. For example, an SS7 message sent from the SS7 network may be destined for point code (8-10-1), which corresponds to signaling end point 240. If the SS7 message is received by the signaling transfer point 200, signaling transfer point 200 can then transfer the SS7 message to signaling transfer point 210. Once received at signaling transfer point 210, the message will be sent to the signaling end point 240. The mated pair of signaling transfer points 210 and 230 are linked to the signaling end points 240, 250, and 260. In this configuration, signaling transfer points 210 and 230 are referred to as the home pair for signaling end points 240, 250, and 260. By having two signaling transfer points connected to the signaling end points in a mated pair configuration, failure of the network due to a failure of the link between a signaling transfer point and a signaling end point can be avoided.

The problem with this architecture scheme is that SS7 messages are required to stay in the SS7 protocol format until they reach the end point. The present invention focuses on transitioning messages from an SS7 network to a data network at the signaling transfer point. The present invention also allows for a Signaling System 7 gateway to manage multiple signaling end points.

Figure 3:
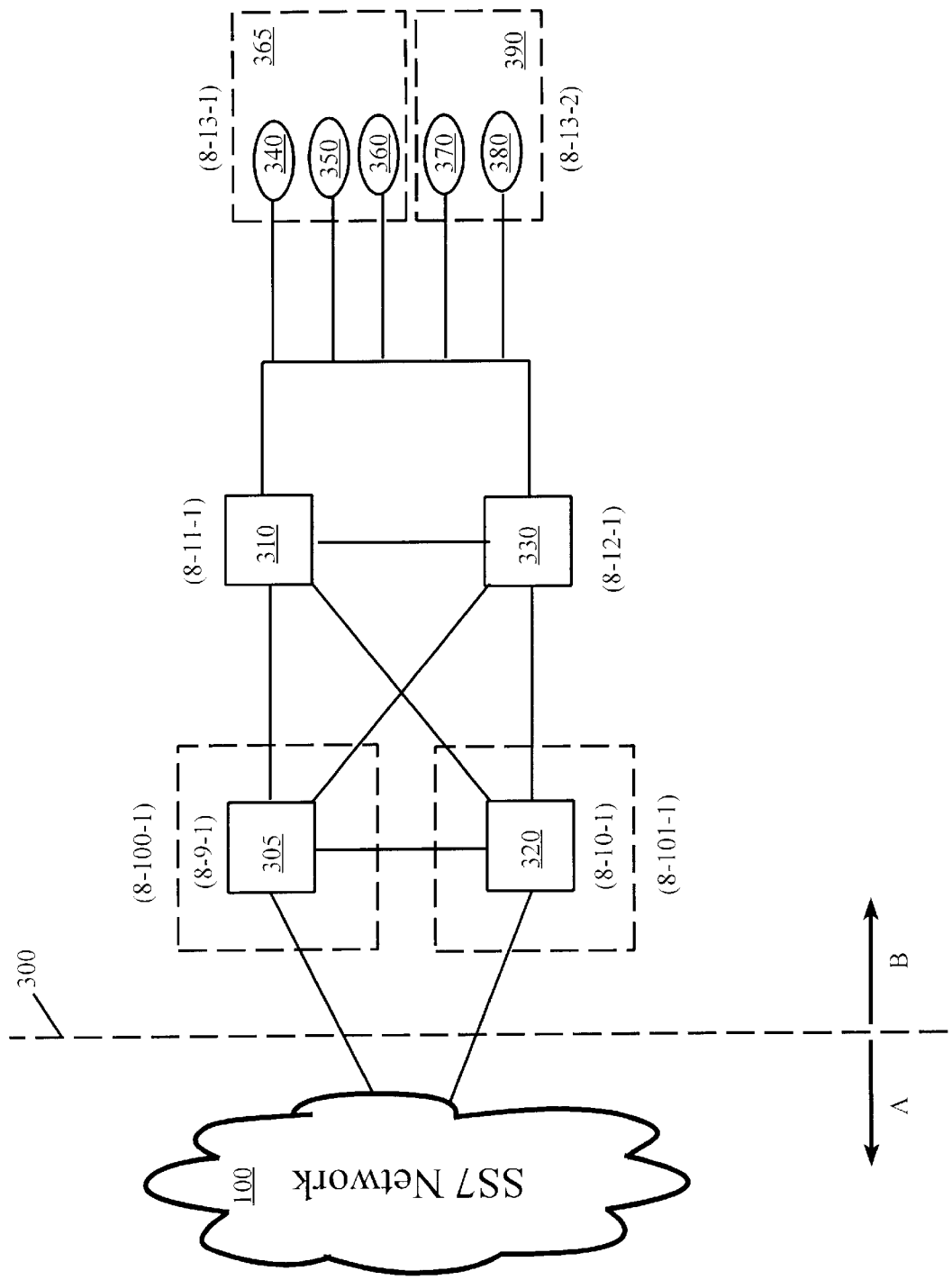
FIG. 3 is a schematic diagram of the system of the present invention.

Referring to FIG. 3, a schematic diagram of the network architecture of the present invention is shown. FIG. 3 shows a communications network connecting Service Provider A with Service Provider B. A SS7 Network 100 is shown in communication with a mated pair of signaling transfer points 305 and 320 across a network boundary 300. Signaling transfer points 310 and 330 represent a home pair for signaling end points 340, 350, 360, 370, and 380, which all reside in a data network. Also shown in FIG. 3 are capability codes or point code aliases (8-100-1) and (8-101-1). Capability codes exist so that a service provider, such as Service Provider B in FIG. 3, can change the architecture and underlying structure of its network or network elements without having to reveal the changes to another service provider, such as Service Provider A. A capability code allows a service provider to keep changes in their network secret while still maintaining network connectivity.

A capability code acts like a point code. A message is sent from the SS7 Network 100 destined for the point code (8-100-1). The SS7 Network of Service Provider A believes the message is destined for the end node (8-100-1) and would appear to be traveling to some physical node within Service Provider B's network. The point code (8-100-1), however, is actually a capability code. The capability code (8-100-1) is not the physical address for any node but rather represents a node, in this case signaling transfer point 305. When Network B receives a SS7 message for (8-100-1), the network immediately knows to route the SS7 message to signaling transfer point 305. Signaling transfer point 305 can then route the SS7 message to its intended destination. Service Provider B can remove or add elements, such as other signaling transfer points, in its network without notifying or adjusting the codes given to Service Provider A because Service Provider A receives the capability codes and does not receive the physical addresses of network elements.

Under the present invention, the concept of capability codes are broadened for use within the network of Service Provider B. The present invention allows signaling transfer points, such as 310 and 330, to terminate SS7 messages, transition the messages into a data network format, determine whether the destination signaling end points, for which the messages are destined, are accessible, and route the messages to the appropriate signaling end points. To achieve this capability, "Extended Capability Codes" are defined within the signaling transfer point, and more particularly in the SS7 gateway.

Multiple signaling end points 340, 350, 360, 370, and 380 are shown in communication with the signaling transfer points 310 and 330. The signaling end points each have their own associated point code or physical address. Under the present invention, the signaling end points 340, 350, and 360 are grouped together under one Extended Capability Code, (8-13-1), depicted by block 365. Likewise, signaling end points 370 and 380 are grouped under an Extended Capability Code, (8-13-2), as depicted by block 390.

After the Extended Capability Codes are defined, representations of the Extended Capability codes can be listed within the home pair signaling transfer point, and thus, in the SS7 gateway. The listings provide the SS7 gateway or signaling transfer points the ability to associate the appropriate signaling end points with each Extended Capability Code. By defining the signaling end points in terms of an Extended Capability Code, the present invention allows messages received from an SS7 network to terminate at a signaling transfer point, such as 310. When the network receives a message destined for an Extended Capability Code, the network believes that the ultimate destination for the message is the address corresponding to the Extended Capability Code. The Extended Capability Code, however, is only an alias for multiple signaling end points, the true destination for the message.

Figure 4:
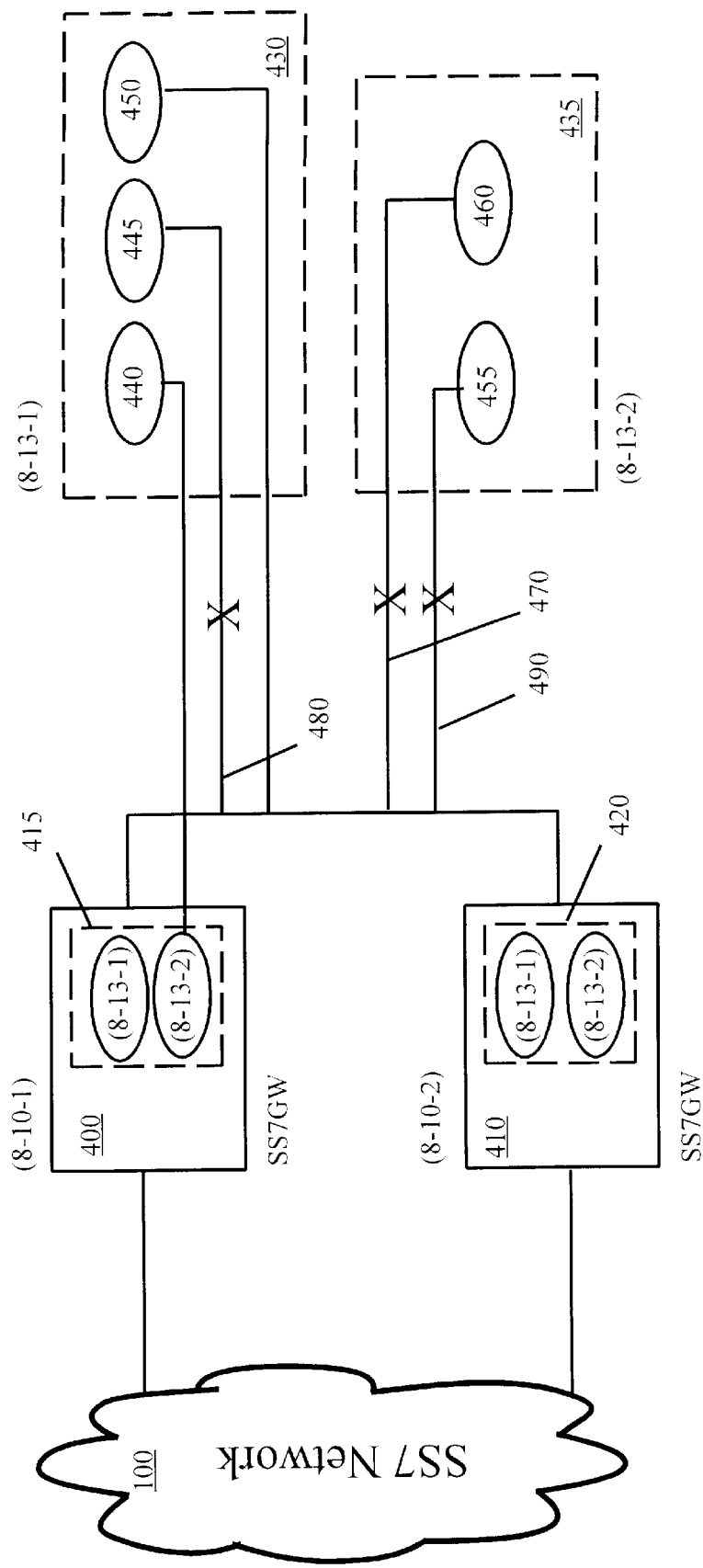
FIG. 4 is a schematic diagram illustrating in more detail the system of the present invention.

FIG. 4 is a schematic diagram illustrating in more detail the architecture of the new SS7 gateway incorporating Extended Capability Codes. An SS7 network 100 is shown in communication with two SS7 gateways 400 and 410. Each SS7 gateway can manage one or more signaling end points. The signaling end points are 440, 445, 450, 455, and 460 respectively. The signaling end points 440 through 460 are in communication with the SS7 gateways 400 and 410. The signaling end points reside in a data network. As shown, signaling end points 440, 445 and 450 are defined under the Extended Capability Code (8-13-1), as represented by block 430. Likewise, signaling end points 455 and 460 are defined under the Extended Capability Code (8-13-2), as represented by block 435. The Extended Capability Codes are listed within the SS7 gateways, as are shown by 415 and 420. By listing the Extended Capability Codes within the SS7 gateways, the SS7 gateways can manage the signaling end points, 440 through 460.

To manage the signaling end points the SS7 Gateways 400 and 410 routinely test accessibility to the signaling end points 440 through 460. For example, the signaling end point 445 is not available to receive messages, as indicated by the over link 480. If the SS7 network 100 tries to send a message to the signaling end point 445, the SS7 Gateway 400 will discard the message and will return a blocking message.

Because the signaling end points are defined under an Extended Capability Code, the SS7 gateway can manage the states of Extended Capability Code. In FIG. 4, the Extended Capability Code (8-13-1), given by block 430, has associated with it signaling end points 440, 445, and 450. A message sent to signaling end point 445 would reveal that the pathway between the SS7 gateway 400 and 410 and the signaling end point 445 is inaccessible. This will invoke standard Route Set Test procedures within the SS7 network 100. This causes the SS7 gateway to list the signaling end point 445 as inaccessible. The Extended Capability Code (8-13-1), however, is accessible because both signaling end point 440 and signaling end point 450 are accessible. Extended Capability Code (8-13-2), given by block 435, would be listed as inaccessible because both signaling end point 455 and signaling end point 460 are inaccessible.

The SS7 gateways can list the Extended Capability Codes as accessible, inaccessible, or restricted. By allowing the SS7 gateways to assess both the accessibility of the signaling end points and the Extended Capability Codes, the states of the Extended Capability Codes and the associated signaling end points can be managed. An Extended Capability Code will be listed as accessible as long as one of the signaling end points associated with the Extended Capability Code is accessible. Messages, however, destined for an inaccessible signaling end point can still be blocked because the SS7 gateway understands that the intended signaling end point is inaccessible.

Figure 5:
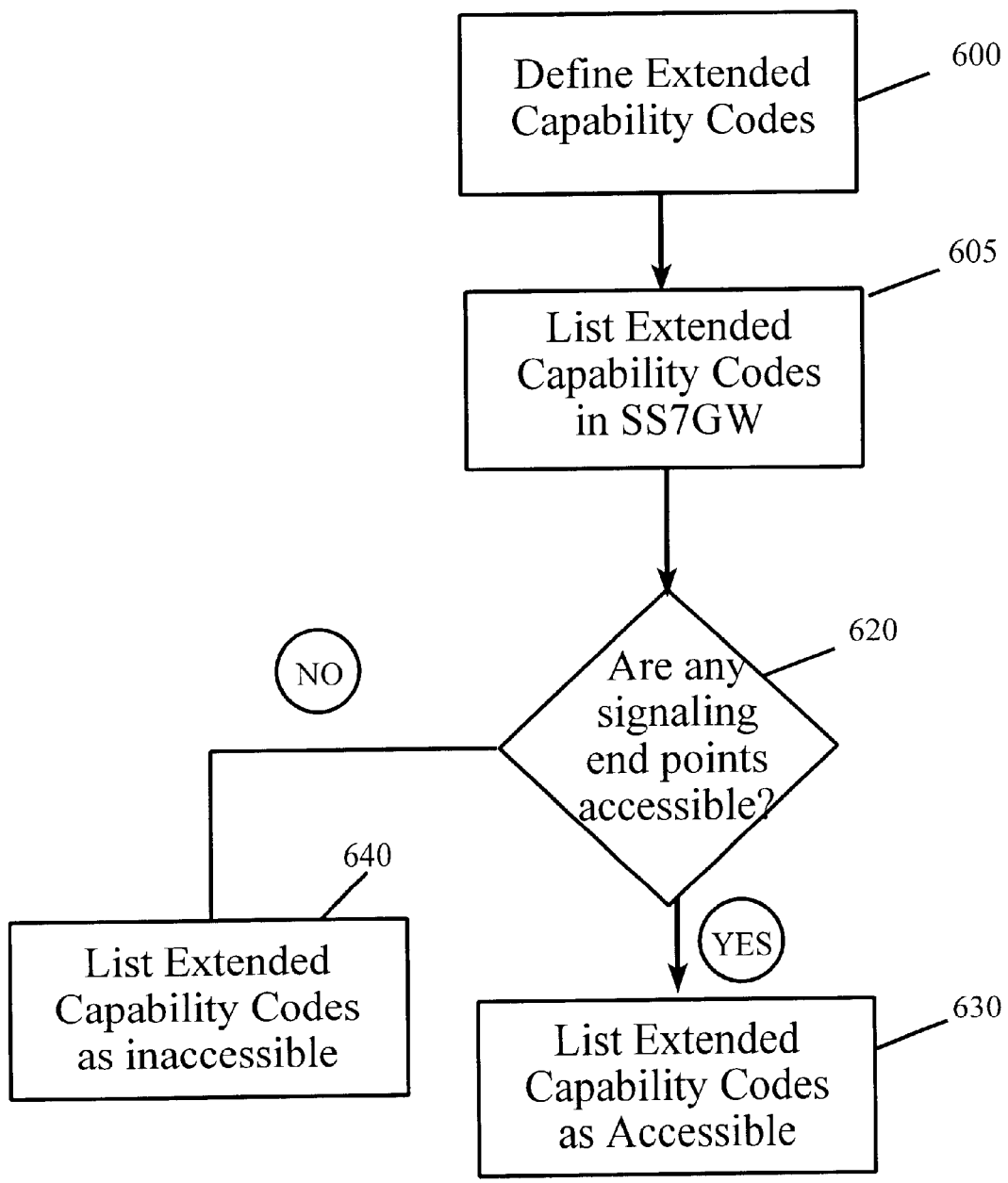
FIG. 5 is a flow diagram of the methods and computer programs of the present invention.

Referring now to FIG. 5, a flow diagram representing the method by which the SS7 gateways manage multiple signaling end points is shown. In block 600, Extended Capability Codes are defined for one or more signaling end points. The Extended Capability Codes are then listed within the SS7 gateway, as indicated by block 605. After listing the Extended Capability Codes in the SS7 gateways, the SS7 gateways can begin to determine if any signaling end points are accessible as shown by block 620. The SS7 gateway can analyze the accessibility of the signaling and points to determine the accessibility of the Extended Capability Codes, as indicated by block 620. If there are any signaling end points which are accessible, then the Extended Capability Code listed within the SS7 gateways can be listed as accessible, as shown by block 630. If, however, no signaling end points are accessible, then the Extended Capability Code can be listed as inaccessible within the SS7 gateways, as shown in block 640. If the Extended Capability Code is listed as inaccessible, no messages can be transferred to any signaling end points associated with the Extended Capability Code. If, however, one signaling end point is accessible for the Extended Capability Code, then messages can be processed by the SS7 gateway for that particular signaling end point.

The method illustrated by FIG. 5 can be embodied as a computer program on a computer readable medium. The computer program can include a code segment for assigning an Extended Capability Code to one or more signaling end points. The computer program may also include a code segment for tracking the accessibility of the signaling end points associated with each Extended Capability Code. In addition, the computer program can include a code segment for determining the accessibility of the Extended Capability Codes.

What is claimed is:

1. A method of managing multiple signaling end points in a telecommunications network, the method comprising the steps of:

defining an extended capability code within a Signaling System 7 (SS7) Gateway, said extended capability code corresponding to one or more signaling end points within a data network;

tracking accessibility of the signaling end points associated with the extended capability code;

listing a state of accessibility of the extended capability code based on the accessibility of the signaling end points;

receiving a SS7 message at the SS7 Gateway, said SS7 message being destined for one of the signaling end points; and transitioning the SS7 message to a data network message if the destination signaling end point is accessible.

2. The method of claim 1 wherein the signaling end points are voice gateways.

3. The method of claim 1 wherein the signaling end points are media gateway controllers.

4. The method of claim 1 wherein the state of accessibility of the extended capability code is accessible.

5. The method of claim 1 wherein the state of accessibility of the extended capability code is inaccessible.

6. The method of claim 1 wherein the data network is selected from the group consisting of Transmission Control Protocol network, Internet Protocol network, and User Datagram Protocol network.

7. The method of claim 1 further comprising:

discarding the SS7 message if the destination signaling end point is inaccessible.

8. The method of claim 1 further comprising:

transferring the data network message to the destination signaling end point.

9. A telecommunications network comprising:

one or more signaling end points residing in a data network being identified by an extended capability code; and a Signaling System 7 (SS7) Gateway in communication with the signaling end points, the Signaling System 7 Gateway being configured to list a state of accessibility of the extended capability code by tracking accessibility of the signaling end points, wherein the SS7 Gateway receives a SS7 message being destined for one of the signaling end points and transitions the SS7 message to a data network message if the destination signaling end point is accessible.

10. The telecommunications network of claim 9 wherein the signaling end points are voice gateways.

11. The telecommunications network of claim 9 wherein the signaling end points are media gateway controllers.

12. The telecommunications network of claim 9 wherein the state of accessibility of the extended capability code is inaccessible.

13. The telecommunications network of claim 9 wherein the state of accessibility of the extended capability code is accessible.

14. The telecommunications network of claim 9, wherein the data network is selected from the group consisting of an Internet Protocol network, a Transmission Control Protocol network, and User Datagram Protocol network.

15. The telecommunications network of claim 9, wherein the SS7 Gateway discards the SS7 message if the destination signaling end point is inaccessible.

16. The telecommunications network of claim 9, wherein the SS7 Gateway transfers the data network message to the destination signaling end point.

* * * * *